Patented May 19, 1953

2,639,279

UNITED STATES PATENT OFFICE 2,639,279

SOLUTION POLYMERIZATION EMPLOYING AQUEOUS SOLUTIONS OF AROMATIC SULFONATES

John R. Caldwell, Kingsport, Tenn., assignor to Eastman Kodak Company, Rochester, N. Y., a corporation of New Jersey No Drawing. Application December 21, 1949, Serial No. 134,339

20 Claims. (Cl. 260—78.4)

This invention relates to an improved solution polymerization process for preparing polymers from compounds containing a single aliphatic $>C=C<$ group by employing, as the solvent medium, an aqueous solution of an alkali metal salt of an aromatic sulfonic acid of the benzene series.

Solution polymerization is a commonly employed process for carrying out polymerization reactions. According to one general method for carrying out such a process, one or more monomeric compounds capable of polymerization are dissolved in a solvent medium (e. g., acetone, ethylene dichloride, benzene, acetic acid, etc.), a catalyst is then introduced into the solution (e. g., benzoyl peroxide, acetyl peroxide, etc.), and the solution is maintained at a suitable temperature until the desired degree of polymerization is attained. If the solvent medium employed is a non-solvent for the polymer, the latter will separate out of solution as it forms during polymerization. The yields obtained by the solution polymerization process are not usually very good when the separation of the polymer depends upon the difference between its solubility and the solubility of the monomer in the solvent being employed. If the solvent employed is also a solvent for the polymer and the latter is desired as a dried product, it must generally be separated by evaporation of the solvent or by an involved precipitation operation.

Emulsion polymerization is likewise a commonly employed process used in carrying out polymerization reactions. According to one general method for carrying out such a process, one or more monomeric compounds capable of polymerization are emulsified (i. e., suspended as a dispersed phase in a dispersion medium, usually aqueous in nature), a catalyst (e. g., sodium perborate, hydrogen peroxide, potassium persulfate, ammonium persulfate, peracetic acid, tertiary butyl peroxide, etc.) is introduced into the emulsion and a suitable temperature is maintained until the desired degree of polymerization is attained. To obtain the emulsion, various surface active compounds known as dispersing agents or emulsifiers are employed. Among them are various sulfonates containing at least 12 to 14 carbon atoms per molecule, e. g., sodium alkyl naphthalene sulfonates, various alkyl aryl sulfonates, various hydrocarbon sulfonates, etc. These dispersing agents are generally employed in concentrations of from 0.2 to 2% based on the weight of the final polymer; however, lower or higher (up to about 5%) concentrations have been used. Upon completion of the polymerization, the emulsion is often difficult to break down into a precipitate and after it has been broken, it is quite difficult to wash all of the dispersing agent out of the precipitated polymer because of its high degree of surface activity resulting in a marked adsorption on the resin particles. Consequently, the resins produced lack a desirable degree of purity and are frequently hazy and off-colored.

I have now found that good yields of polymers of monomeric compounds containing a single aliphatic $>C=C<$ group can be obtained by applying the solution polymerization process to the polymerization of such monomeric compounds employing, as the solvent medium, an aqueous solution of an alkali metal salt of an aromatic sulfonic acid of the benzene series.

The aromatic sulfonates employed contain from 6 to less than 12 carbon atoms (advantageously from 6 to 9 carbon atoms) and are not surface active agents. These aromatic sulfonates are used to prepare the solvent medium by dissolving one or more of them in relatively high concentrations in water, e. g. from about 20 to about 50% based on the weight of the water employed. It was quite unexpected to find that most monomeric compounds containing a single aliphatic $>C=C<$ group were appreciably soluble in such concentrated solutions. According to the teachings of the prior art, it would be expected that such monomers would be "salted out" of solution by such high sulfonate salt concentrations. The polymers prepared in accordance with my process are obtained in remarkably good yields and in an easily separated and readily purified physical state as granular precipitates which are readily washed and dried. The dried granular precipitate is in a form that can be used as a molding powder or can be readily dissolved in any of the known organic solvents for the particular resin being dissolved, whereupon the solution can then be used in the manufacture of sheets, films, fibers, etc.

An object of my invention is to provide an improved process for the solution polymerization of monomeric compounds containing a single aliphatic $>C=C<$ group. Another object of my invention is to provide a new solvent medium for monomers of such compounds. Additional objects will become apparent hereinafter.

In accordance with my invention, I prepare synthetic resins by polymerizing a monomeric compound containing a single aliphatic >C=C< group in an aqueous solution of an alkali metal salt of an aromatic sulfonic acid of the benzene series containing a polymerization catalyst.

The monomeric compounds containing a single aliphatic >C=C< group which can be polymerized in accordance with my invention include, for example, (1) Compounds containing a $CH_2=CH-$ (vinyl radical), e. g. styrene, vinyl ethers, acrylic acid and its esters such as methyl acrylate, acrylamides such as N-phenylacrylamide, acrylonitrile, vinyl esters such as vinyl acetate, vinyl halides such as vinyl chloride, etc.

(2) Compounds containing a $-CH=CH-$ group, e. g. fumaric acid esters such as dimethyl fumarate and diethyl fumarate, maleic acid esters such as dimethyl maleate and diethyl maleate, etc.

(3) Compounds containing a $CH_2=C<$ (vinylidene radical), e. g. vinylidene halides such as vinylidene chloride and vinylidene fluoride, methacrylic acid and its esters such as methyl methacrylate, methacrylonitrile, α-cyanoacrylic acid esters such as ethyl α-cyanoacrylate, α-chloracrylic acid esters such as methyl α-chloracrylate, methallyl alcohol, isopropenyl esters such as isopropenyl acetate, etc.

(4) Compounds containing a $-CH=C<$ group, e. g. 1,1-difluoro-2-chloroethylene, etc.

(5) Compounds containing a $>C=C<$ group, e. g. 1,1-difluoro-2,2-dichloroethylene, etc.

From a practical aspect, it is advantageous to employ a compound containing a single aliphatic >C=C< group which is soluble at 50° C. to the extent of at least 3 grams per 100 cc. of a solution of the aromatic sulfonate in which it is the most soluble.

Since the conjugated dienes, such as isoprene, are definitely insufficiently soluble, they are not included within the scope of my invention as is indicated by the restriction to compounds containing "a single aliphatic >C=C< group." A very large number of the compounds containing a single aliphatic >C=C< group are considerably more soluble than the minimum extent, and those that are not that soluble can also be polymerized in accordance with my process although not as advantageously as the others, i. e. those that are less soluble at 50° C. than 3 grams per 100 cc. of the solution.

The alkali metal salts of aromatic sulfonic acids of the benzene series which can be employed can be represented by the formula:

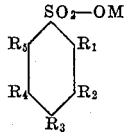

wherein $R_1$, $R_2$, $R_3$, $R_4$ and $R_5$ each consist of a hydrogen atom or a lower alkyl radical and M represents an alkali metal atom. Advantageously, the alkyl radicals are selected from among methyl, ethyl, propyl and isopropyl radicals and the sum of the carbon atoms contained in all of the alkyl substituents does not exceed 3. Thus, I advantageously employ an aromatic sulfonate of the benzene series containing from 6 to 9 carbon atoms having the above formula wherein each of $R_1$, $R_2$, $R_3$, $R_4$, and $R_5$ is selected from the group consisting of hydrogen atoms, and methyl, ethyl, propyl and isopropyl radicals, and M represents an alkali metal atom. Most advantageously M represents a sodium or a potassium atom. Examples of the types of aromatic sulfonates of the benzene series which can be employed include the alkali metal benzene sulfonates and various position isomers of the toluene sulfonates, the xylene sulfonates, the trimethyl benzene sulfonates, the cumene sulfonates, etc. Specific examples include sodium p-cumene sulfonate, sodium p-toluene sulfonate, potassium p-ethylbenzene sulfonate, sodium 3,5-xylene sulfonate, potassium 2,4,6-trimethylbenzene sulfonate, etc. It is also possible to employ mixtures of such sulfonates, e. g. the sodium sulfonates derived from commercial mixed xylenes can be advantageously employed. The positions of the various alkyl substituents on the benzene nucleus have little practical effect upon the solvent properties of the aromatic sulfonates. These alkali metal salts of aromatic sulfonic acids of the benzene series as defined, are referred to elsewhere in this specification as aromatic sulfonates for convenience.

The aromatic sulfonates can be employed as aqueous solutions in a wide variety of concentrations, e. g. from about 20% to about 50% by weight of the water in which the are dissolved. Higher or lower concentrations can also be employed; however, it is generally advantageous to employ concentrations of from 20% to 40% by weight of the water. As illustrative of the solubilities in such a solvent medium, of various monomeric compounds containing a single aliphatic >C=C< group, the following data is tabulated showing the solubility (grams of monomer per 100 cc. of solvent medium) in both a 40% aqueous solution of sodium p-cumene sulfonate and in water at 50° C. in each instance:

| Monomer | Solubility in— | |
| --- | --- | --- |
|  | Cumene Salt Sol'n | Water |
| Acrylonitrile | 30 | 8 |
| Methyl acrylate | 36 | 6 |
| Methyl methacrylate | 18 | 2 |
| Methyl α-chloroacrylate | 12 | <1 |
| Vinyl acetate | 18 | 8 |
| Vinyl chloride | 12 | <1 |
| Styrene | 6 | <1 |
| Isoropenyl acetate | 18 | 2 |
| Dimethyl maleate | 100 | 2 |
| Dimethyl fumarate | 12 | 2 |
| Diethyl maleate | 24 | <1 |
| Diethyl fumarate | 3 | <1 |

Polymerization can be effected in solutions of the aromatic sulfonates employing any of the known polymerization catalysts for compounds containing a single aliphatic >C=C< group. From 0.05 to about 3.0 per cent by weight of such catalysts, based on the weight of the monomer, can be employed; however, higher or lower proportions can also be employed. Generally, from 0.4 to 0.8% is the most advantageous range. As exemplary of such catalysts, the organic and the inorganic peroxy compounds can be employed, for example, benzoyl peroxide, acyl peroxides such as acetyl peroxide, lauroyl peroxide, dialkyl peroxides such as diethyl peroxide, tertiary butyl peroxide, acetylbenzoyl peroxide, oleoyl peroxide, perbenzoic acid, peracetic acid, tetrahydronaphthalene hydroperoxide, magnesium peroxide, perborates such as sodium perborate and ammonium perborate, percarbonates such as sodium percarbonate, persulfates such as potassium persulfate, perphosphates such as ammonium perphosphate, hydrogen peroxide, etc. Catalytic activators such as sodium sulfite, sodium bisulfite, sodium hydrosulfite, dialkyl sulfites, etc. can be employed in conjunction with these catalysts if desired.

The aqueous aromatic sulfonate solution of the monomer containing the polymerization catalyst can be heated at a temperature of from about 25° C. to about 100° C. or at higher or lower temperatures depending upon the monomer being polymerized, and the degree and speed of polymerization desired. The period of time required for polymerization is generally from about 24 to about 48 hours, but this period is subject to considerable variation and can be extended or shortened depending upon the monomer being employed and the molecular weight desired in the polymer being produced.

In carrying out the process of my invention, it is advantageous to prepare a saturated solution of the vinyl monomer in the aqueous solution of the aromatic sulfonate so that, as the monomer polymerizes, the polymer separates out of solution as a granular precipitate, it being relatively insoluble in the sulfonate salt solution. The precipitate can then be readily separated and purified.

It is also practicable and frequently advantageous to introduce more of the monomer into the sulfonate salt solution than is soluble therein, thereby forming a saturated solution containing an excess of the monomer in the undissolved state. Then, as the dissolved monomer polymerizes, the polymer separates out of solution and more monomer dissolves until practically all of the undissolved monomer has been dissolved, polymerized, and the polymer precipitated out as a granular mass. In order to accomplish this most advantageously, it is necessary to keep the mixture efficiently stirred during the course of the polymerization.

In some instances it may be advantageous to dilute the mixture upon the completion of the polymerization with water in order to cause the best possible separation of the granular mass of polymer from the remainder of the mixture; however, this is generally of no particular advantage.

The granular polymeric precipitate obtained by means of my improved process can be easily washed with water to produce a product of high purity since the aromatic sulfonate contained in the polymerization solvent medium is not a surface active compound as are the higher molecular weight sulfonate salts containing 12 to 14 or more carbon atoms. The wash water can be saved and concentrated to whatever concentration of aromatic sulfonate is being currently employed, whereupon it can then be used again in the polymerization process. This concentrating operation can be effected by either evaporation or by the addition of the currently being employed aromatic sulfonate to the dilute solution, or by a combination of both alternates.

An inert atmosphere (e. g. nitrogen) which surrounds the mixture undergoing polymerization can be employed; however, the use of such an atmosphere is not critical and can be omitted.

It is apparent that the procedure used in operating in accordance with my invention is essentially that normally employed in the usual solution polymerization techniques except for the solvent medium employed. The preceding disclosure of my invention as applied to simple polymers or homopolymers can be similarly applied to the preparation of copolymers. In most cases the yields obtained while operating in accordance with my invention are better than those generally obtained when the previously known solution polymerization methods which employ the common organic solvents are used.

The following examples will serve to further illustrate the manner of practicing my invention:

Example 1

Forty grams of acrylonitrile, 10 g. of methyl acrylate and 0.3 g. of benzoyl peroxide were dissolved in 150 cc. of a 35% aqueous solution of mixed sodium xylene sulfonates (derived from commercial mixed xylenes). The solution was allowed to stand 30 hours at 50° C. An opaque suspension of a resin was obtained. This product was stirred with an equal volume of water and the granular precipitate was filtered and washed with water. A yield of 45 g. of the copolymer was obtained which upon analysis was shown to contain 78% of acrylonitrile. The dried resin was in the form of small, uniform granules that dissolved readily in dimethylformamide.

Example 2

Fifteen grams of acrylonitrile, 5 g. of acrylic acid, and 0.1 g. of benzoyl peroxide were dissolved in 75 cc. of a 40% aqueous solution of mixed sodium xylene sulfonates (derived from commercial mixed xylenes). The solution was allowed to stand 24 hours at 60° C. The polymerized copolymer separated out as a granular precipitate and was quite readily washed free of the sodium xylene sulfonates. After drying the washed granules, the yield obtained was 20 grams.

Example 3

Ten grams of vinyl acetate, 20 g. of acrylonitrile and 0.05 g. of potassium persulfate were dissolved in 75 cc. of a 40% aqueous solution of sodium p-cumene sulfonate. This solution was allowed to stand for 24 hours at 60° C. A yield of 26 g. of washed and dried granular resin was obtained which contained, as shown by analysis, a 63% content of acrylonitrile.

Example 4

Ten grams of methylmethacrylate and 0.01 g. of acetyl peroxide were dissolved in 65 cc. of a 30% aqueous solution of sodium p-toluene sulfonate. This solution was allowed to stand for 30 hours at 70° C. Polymethylmethacrylate was obtained as a granular precipitate which was washed and dried to give a yield of 9.2 grams of the resin.

Example 5

Twenty-five g. of vinyl acetate and 0.1 g. of sodium persulfate were stirred into 100 cc. of a 30% aqueous solution of mixed sodium xylene sulfonates (derived from commercial mixed xylenes) at 50° C. An atmosphere of nitrogen was maintained above the mixture. Polyvinyl acetate began to separate after 4 to 6 hours. After 24 hours polyvinyl acetate was obtained as a granular precipitate which, when washed and dried, gave a yield of 22 g. of the resin.

Example 6

Thirty grams of acrylonitrile and 0.05 g. of potassium persulfate were dissolved in 100 cc. of a 40% aqueous solution of sodium p-cumene sulfonate. After standing at 45° C. for 24 hours, a precipitate of polyacrylonitrile was obtained which was easily washed with water to give a salt-free product. A yield of 28 g. of the dried resin was obtained.

Example 7

Two hundred cc. of a 40% aqueous solution of sodium p-cumene sulfonate, 12 g. of styrene and 0.1 g. of potassium persulfate were mixed and allowed to stand at 60° C. for 18 hours. Polystyrene was obtained as a granular precipitate which was filtered off and washed. A yield of 11 g. of the dried resin was obtained.

Example 8

One hundred cc. of a 38% aqueous solution of potassium p-ethylbenzene sulfonate, 15 g. of vinyl acetate, 10 g. of dimethyl fumarate and 0.3 g. of benzoyl peroxide were mixed and allowed to stand for 24 hours at 65° C. The interpolymer separated out as a fine, white, granular precipitate which was filtered, washed and dried. A yield of 22 g. was obtained.

Example 9

One hundred cc. of a 40% aqueous mixed sodium xylene sulfonate (derived from commercial mixed xylenes), 15 g. of dimethyl maleate, 15 g. of vinyl acetate and 0.4 g. of acetyl peroxide were mixed and the solution was allowed to stand at 50° C. for 30 hours. A yield of 26 g. of the washed and dried interpolymer was obtained.

In a manner similar to that set forth in the preceding examples, polymers of other compounds containing a single $>C=C<$ group can be prepared. Thus, 1,1-difluoro-2-chloroethylene or 1,1-difluoro-2,2-dichloroethylene can be polymerized in a solution of potassium p-cumene sulfonate. Likewise, methyl α-cyanoacrylate and isopropenyl acetate can be polymerized in a solution of sodium p-ethylbenzene sulfonate. There are obviously many other monomeric compounds and aromatic sulfonate solutions which can be employed in a multitude of varying combinations, concentrations, etc. with one or several of the large number of catalysts previously mentioned, under or in the absence of an inert atmosphere, at various temperatures and for different periods of time.

What I claim as my invention and desire to secure by Letters Patent of the United States is:

1. A process for preparing a synthetic resin by the solution polymerization process comprising polymerizing in an aqueous solution containing a polymerization catalyst and from 20 to 40 per cent by weight of the water of an aromatic sulfonate containing from 6 to 9 carbon atoms having the general formula:

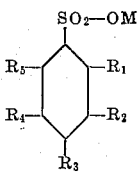

wherein each of $R_1$, $R_2$, $R_3$, $R_4$, and $R_5$ represents a substituent selected from the group consisting of hydrogen atoms and methyl, ethyl, propyl and isopropyl radicals and M represents an alkali metal atom, a monomeric compound containing a single aliphatic $>C=C<$ group which is soluble in the solution at 50° C. to the extent of at least 3 grams per 100 cc. of the solution.

2. A process as defined in claim 1 wherein the monomeric compound is comprised principally of vinyl acetate.

3. A process as defined in claim 1 wherein the monomeric compound is comprised principally of acrylonitrile.

4. A process as defined in claim 1 wherein the monomeric compound is comprised principally of methylmethacrylate.

5. A process as defined in claim 1 wherein the monomeric compound is comprised principally of styrene.

6. A process as defined in claim 1 wherein the monomeric compound is comprised principally of dimethyl maleate.

7. A process for preparing a synthetic resin by the solution polymerization process comprising polymerizing, in an aqueous solution containing a peroxy compound and from 20 to 40 per cent by weight of the water of an aromatic sulfonate containing from 6 to 9 carbon atoms having the general formula:

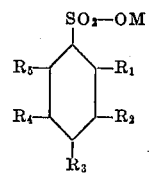

wherein each of $R_1$, $R_2$, $R_3$, $R_4$ and $R_5$ represents a substituent selected from the group consisting of hydrogen atoms and methyl, ethyl, propyl and isopropyl radicals and M represents an alkali metal atom, a monomeric compound containing a single aliphatic $>C=C<$ group which is soluble in the solution at 50° C. to the extent of at least 3 grams per 100 cc. of the solution.

8. A process as defined in claim 7 wherein the monomeric compound consists essentially of vinyl acetate.

9. A process as defined in claim 8 wherein the aromatic sulfonate is potassium p-ethylbenzene sulfonate.

10. A process as defined in claim 7 wherein the monomeric compound consists essentially of acrylonitrile.

11. A process as defined in claim 10 wherein the aromatic sulfonate is a sodium xylene sulfonate.

12. A process as defined in claim 7 wherein the monomeric compound consists essentially of methylmethacrylate.

13. A process as defined in claim 12 wherein the aromatic sulfonate is sodium p-toluene sulfonate.

14. A process as defined in claim 7 wherein the monomeric compound consists essentially of styrene.

15. A process as defined in claim 14 wherein the aromatic sulfonate is sodium p-cumene sulfonate.

16. A process as defined in claim 7 wherein the monomeric compound consists essentially of dimethyl maleate.

17. A process as defined in claim 16 wherein the aromatic sulfonate is a sodium xylene sulfonate.

18. A process for preparing a synthetic resin by the solution polymerization process comprising polymerizing in an aqueous solution containing a polymerization catalyst and from about 20 to about 50 per cent by weight of the water of an aromatic sulfonate containing from 6 to 9 carbon atoms having the general formula:

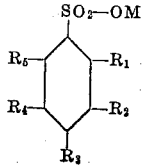

wherein each of $R_1$, $R_2$, $R_3$, $R_4$ and $R_5$ represents a substituent selected from the group consisting of hydrogen atoms and methyl, ethyl, propyl and isopropyl radicals and M represents an alkali metal atom, a monomeric compound containing a single aliphatic $>C=<$ group which is soluble in the solution at 50° C. to the extent of at least 3 grams per 100 cc. of the solution.

19. A process as defined in claim 18 wherein the polymerization catalyst is a peroxy compound.

20. A process as defined in claim 19 wherein from 0.05 to 3 per cent by weight of the monomer of the peroxy compound is employed.

JOHN R. CALDWELL.

References Cited in the file of this patent

UNITED STATES PATENTS

| Number | Name | Date |
|---|---|---|
| 2,375,140 | Semon | May 1, 1945 |
| 2,473,929 | Wilson | June 21, 1949 |
| 2,488,502 | Park et al. | Nov. 15, 1949 |
| 2,489,959 | Dunlap | Nov. 29, 1949 |

OTHER REFERENCES

Burk et al., "High Molecular Weight Organic Compounds," published by Interscience Publishers, Inc., New York, 1949, pages 27–28.